US00RE36333E

United States Patent [19]

Kovaletz

[11] E Patent Number: Re. 36,333

[45] Reissued Date of Patent: Oct. 12, 1999

[54] FIXTURE APPARATUS FOR ELEVATED LINES

[76] Inventor: Mark P. Kovaletz, 1935 Brandon Cir., Anaheim Hills, Calif. 92807

[21] Appl. No.: 08/975,831

[22] Filed: Nov. 21, 1997

Related U.S. Patent Documents

Reissue of:

[64] Patent No.: 5,467,730
Issued: Nov. 21, 1995
Appl. No.: 08/199,668
Filed: Feb. 22, 1994

U.S. Applications:

[63] Continuation-in-part of application No. 08/068,427, May 27, 1993, abandoned.

[51] Int. Cl.[6] ..... G01D 21/00

[52] U.S. Cl. ..... 116/209; 116/200; 116/DIG. 33; 174/135

[58] Field of Search ..... 116/200, 209, 116/DIG. 33; 174/42, 135, 146, 40 R, 41, 43, 45 R, 45 TD, 40 TD; 29/433, 463, 709, 714

[56] References Cited

U.S. PATENT DOCUMENTS

| | | | |
|---|---|---|---|
| 297,487 | 4/1884 | Bacon | 116/209 |
| 3,135,236 | 6/1964 | Pfeiffer et al. | 116/209 |
| 3,183,883 | 5/1965 | Ruhlman et al. | 116/209 |
| 3,253,571 | 5/1966 | Williams | 116/209 |
| 3,268,655 | 8/1966 | Haigh et al. | 174/146 |
| 3,362,377 | 1/1968 | Hill et al. | 116/209 |
| 3,430,325 | 3/1969 | Lematta | 116/209 |
| 4,037,191 | 7/1977 | Deane et al. | 340/983 |
| 4,474,133 | 10/1984 | Anderson et al. | 116/209 |
| 4,839,567 | 6/1989 | Milton et al. | 315/344 |
| 4,885,835 | 12/1989 | Osgood | 116/209 |
| 4,943,099 | 7/1990 | Gabriel | 294/82.32 |
| 4,971,082 | 11/1990 | Kovaletz | 134/34 |
| 5,001,402 | 3/1991 | Milton et al. | 315/344 |
| 5,038,465 | 8/1991 | Jans . | |
| 5,280,765 | 1/1994 | Segerstrom | 116/DIG. 33 |

OTHER PUBLICATIONS

"Spanguard/Helimark Power Line Markers" brochure; P&R Industries, Portland; OR; 4 pp., no date.

"Tana Wire Marker" produce data sheet; Tana Manufacturing, Inc.; California, MO; 1p., Feb. 1990.

U.S. Department of Energy specification sheet; 1p., Apr. 13, 1988.

*Primary Examiner*—Andrew Hirschfeld
*Attorney, Agent, or Firm*—Sheldon & Mak

[57] ABSTRACT

A fixture for elevated utility lines, deployable from a hoverable vehicle having a load attachment point, each fixture having a body with a slot formed therein for receiving the line; a trap having one or a pair of movable arms for holding the line within the slot; a cocking mechanism for holding the trap in an open condition; and a trigger mechanism activated by contact with the line for releasing the cocking mechanism, and a trap releaser including a supportive hook receiver for releasing the trap during removal of the body from the line. A system for deploying fixtures also includes a base, an attachment for releasably suspending the base from the load attachment point and having a stabilizer bar supportively connected relative to the attachment point and resiliently oriented relative to the vehicle, a yoke releasably supported relative to the load attachment point, the base being suspended from the yoke. A plurality of the fixtures can be stored on the base for deployment therefrom, at least one releasable fixture hook being supported on the base for engaging one of the hook receiving members. The fixtures are sequentially affixable at selected locations along the line, at least one of the fixtures being retrievable from the line by engagement of the hook receiver by the marker hook. The fixture can be configured as a safety marker, as well as a spacer for groups of conductors of the line.

49 Claims, 6 Drawing Sheets

70
62
94
64
64
70
92
62
56
54
56
48
62
68
68
52
68
68
64
62
66
60
66
62
50
38
38
62
32
40
40

52

102
58
32
d
104
26
24
104
58
26
34
44
36
36
36
102
44
42
42
22
46
46

FIXTURE APPARATUS FOR ELEVATED LINES

Matter enclosed in heavy brackets [ ] appears in the original patent but forms no part of this reissue specification; matter printed in italics indicates the additions made by reissue.

*RELATED APPLICATION*

This application is a continuation-in-part of application Ser. No. 08/068,427, filed on May 27, 1993, now abandoned, which is incorporated herein by reference.

BACKGROUND

The present invention relates to fixtures including aerial markers and spacers for elevated cables, such as power transmission lines, for preventing collisions between nearby aircraft and the lines, and for facilitating maintenance of the lines.

Power lines are typically suspended from spaced towers, the towers being widely spaced apart where the lines extend across canyons, rivers, and the like. In such cases the lines have substantial elevation over the ground between the towers and thus present hazardous conditions for aircraft. Consequently, various line markers have been developed to reduce such hazards. For example, U.S. Pat. No. 4,885,835 to Osgood discloses a power-line marker having a pair of flanged hemispheric shells that are assembled on opposite sides of the line and anchored thereto by wire strands that are spirally twisted about the line.

U.S. Pat. No. 3,362,377 to Hill et al. discloses a span marker having nested spherical shell segments that are movable between an open position for receiving the line and a closed position clamping the line. An installation tool that is manipulated from a helicopter is used for lowering the marker onto the line and removing a locking pin that temporarily holds the shell segments open against a biasing spring. Removal of the marker, if desired, is effected by hooking onto and retracting another locking pin that anchors the biasing spring, and that is tethered to one of the shell segments.

These and other line markers of the prior art exhibit a number of disadvantages, such as one or more of the following:

1. They are difficult to install in that they require assembly in place on the line by means of fasteners and the like, and in case of installation by helicopter, they require multiple crew members;
2. They are difficult or impractical to remove from the line or relocated on the line because of required disassembly, because clamping mechanisms thereof are disabled by being released, or because the clamping mechanisms become vulcanized onto the line;
3. They are limited in application to a narrow range of line sizes;
4. They are ineffective in that they are subject to being moved out of place on the line in the presence of wind loading, particularly in cases when the markers are not concentrically located on the line; and
5. They are unreliable in that they have clamp mechanisms that are subject to high levels of frictional resistance to clamping in relation to available clamping forces.

Other fixtures for transmission lines include suspended spacers for maintaining grouped conductors of transmission lines in a predetermined closely spaced relation. Spacers of the prior art are subject to many of the above disadvantages of the markers, particularly in that installation is complicated by the need to engage a plurality of conductors.

Thus there is a need for line fixtures and a system for installing and maintaining same that is effective, safe and inexpensive to produce and use.

SUMMARY

The present invention meets this need by providing a line fixture system including fixtures that automatically latch onto the line upon placement thereon, the fixtures being positively released from the line when it is desired to remove or relocate them. In one aspect of the invention, a fixture apparatus includes a body having a slot formed therein for receiving a conductor of the line; a trap for holding the conductor within the slot, the trap being activated by movement of the conductor into the slot; and a trap releaser for releasing the trap during removal of the body from the conductor, the trap releaser including a hook receiver movably connected to the body for support thereof during removal of the body from the conductor; and a connector for connecting the hook receiver to the trap for release thereof when the body is supported by the hook receiver, without preventing subsequent reactivation of the trap. In this specification, the term "line" can refer to a single elevated member or a plurality of discrete members such as conductors that can be electrical conductors.

The trap can include a first arm movable between an open position for receiving the conductor within the slot and a closed position for clamping the conductor; a trap closer for moving the arm toward the closed position; a cocking mechanism for holding the arm in the open position; and a trigger mechanism for releasing the cocking mechanism, the trigger mechanism being activated by contact with the conductor.

The connector can include a tension member operating the arm for overcoming the closer in response to the movement of the hook receiver relative to the body. The arm member can be pivotally movable relative to the body and connected to the trap closer for movement thereby. The trap closer can include a cantilevered leaf spring extending from the arm member to a stationary member for biasing the arm member. In preferred configurations, the connector of the trap releaser includes a cam operated by the tension member and a cam follower connected to the arm for moving the arm to the open position when the hook receiver is moved upwardly relative to the body. Preferably the cam provides initial opening movement of the arm at high mechanical advantage for overcoming adhesion between the arm and the conductor. The trap can include a pair of the arm members, the conductor being received between the arm members in the open position and clamped between the arm members in the closed position.

Preferably the apparatus is adapted for deployment from a hoverable vehicle, the vehicle having a load attachment point, the apparatus further including base means for defining a base; attachment means for releasably suspending the base means from the load attachment point; storage means on the base means for storing a plurality of the bodies; and at least one releasable marker hook for engaging one of the hook receiving members. Thus the marker bodies are sequentially affixable at selected locations along the line, and at least one of the bodies is retrievable from the line by engagement of the hook receiving member thereof by the marker hook.

The attachment means can include a rigid stabilizer bar supportively connected relative to the attachment point and resiliently oriented relative to the vehicle; a yoke member releasably supported relative to the load attachment point, the yoke member fixably engaging the stabilizer bar when the yoke member is supported relative to the load attachment point; stabilizer biasing means for yieldably holding the stabilizer bar fixed about the vertical axis and at least one horizontal axis of the vehicle; and means for suspending the base means from the yoke member.

The means for suspending the base means from the yoke member can include a pair of load tension members that are connected from opposite ends of the yoke member to spaced apart locations on the base means. The apparatus can further include means for defining an anchor point on each of the structural members, the stabilizer biasing means including a pair of elastically extendable members, each of the extendable members extending from proximate one of the bar attachment points to proximate a respective anchor point. The attachment means can include registration means rigidly connected to the base means, the registration means being adapted for engaging a structural element of the vehicle; and a base hook engagement member attached to the base for engagement by the load hook, whereby a combination of the base hook engagement member and the registration means is capable of holding the base means at least yieldably fixed relative to the vehicle.

The hook receiver can be a movable hook receiver, the apparatus further including a fixed hook receiver on the body for support thereof during positioning of the body on the line.

Preferably the body has a column member rigidly depending therefrom adjacent the slot for facilitating entry of the line into the slot. More preferably a lower extremity of the column has a counterweight thereon for enhancing stability of the fixture apparatus in an upright position on the line. The body can include a marker housing for marking the conductor. The line can have a plurality of conductors including a closely spaced group of the conductors, the slot being a primary slot for receiving one of the conductors, the body having at least one secondary slot for engaging at least one other conductor of the group, the apparatus holding the engaged conductors in a predetermined spaced relation. The apparatus can include a latch member supported relative to the secondary slot that is operable when the trap is activated to clamp the one conductor for holding the other conductor within the secondary slot. The latch member can be coupled to the trap and to the trap releaser for operation of the latch member corresponding to activation and release of the trap. The group can include at least three conductors, the body having at least two secondary slots for corresponding other conductors, the engagement of conductors with the secondary slots restraining the body from disengagement with the other conductors when the trap is activated.

DRAWINGS

These and other features, aspects, and advantages of the present invention will become better understood with reference to the following description, appended claims, and accompanying drawings, where:

DESCRIPTION

Figure 3:
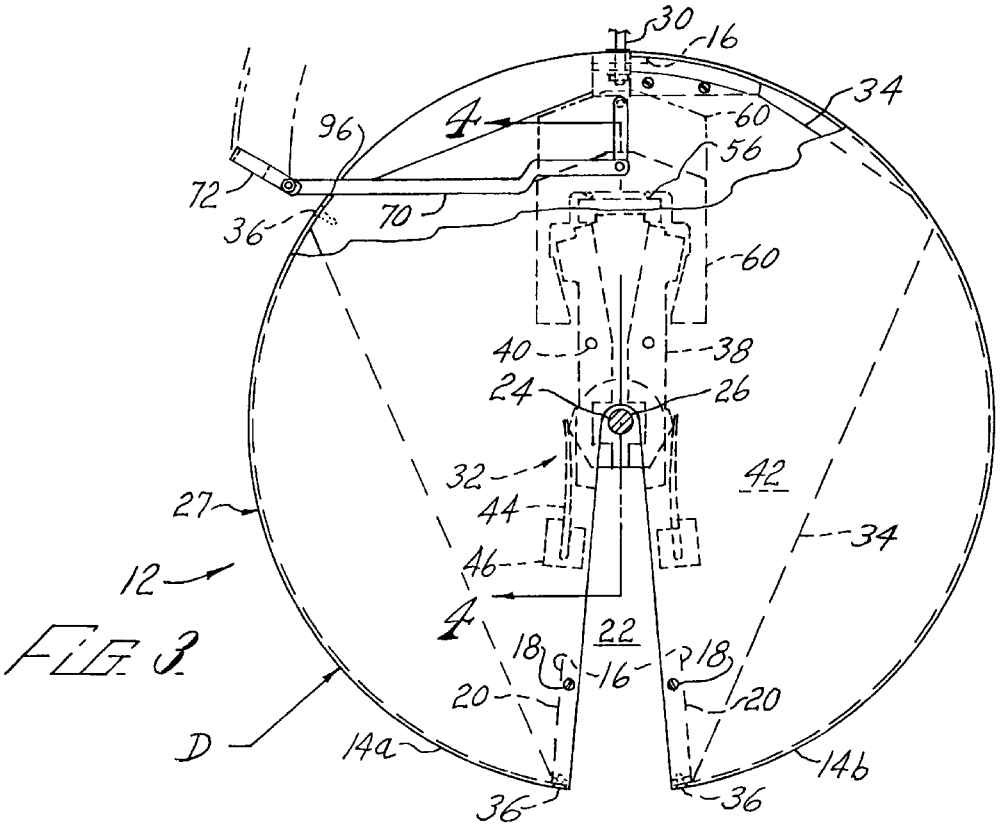
FIG. 3 is an end elevational view of the fixture of FIG. 2.

The present invention is directed to a line fixture system that is safely, effectively and efficiently implemented using fixtures that are conveniently delivered, retrieved and/or relocated by helicopter. With reference to FIGS. 1–9 of the drawings, an exemplary configuration of the present invention is implemented as a marker system 10, including one or more fixture or marker units 12 that are typically spherically shaped and brightly colored for visual identification by nearby aircraft. In the exemplary system 10, each marker unit 12 has a pair of approximately hemispherically shaped shell members of outside diameter D, designated first shell member 14a and second shell member 14b, that are joined along semicircular marginal portions thereof and connected by means of a generally circular frame member 16, using suitable fasteners 18 as best shown in FIGS. 2 and 3. A lower portion of the frame member 16 is split longitudinally, having spaced-apart branch portions 20 that are also fastened by additional ones of the fasteners 18 to correspondingly spaced marginal portions of the shell member 14a, 14b for stiffening same.

The branch portions 20 of the frame member 16, together with portions of the shell members 14a, 14b that are fastened thereto, define a body having a slot or wedge-shaped opening 22 for receiving an aerial conductor or line 24 on which the marker 12 is to be clamped, the line 24 being oriented generally along a longitudinal marker axis 26 that is coaxial with the shell members 14a, 14b. The shell members 14a, 14b, together with the frame member 16, thus form a housing 27 of the marker 12. A pair of support shoes 28 are mounted at opposite ends of the opening 22 for supportively contacting the line 24. A hook-engaging first loop 30 is mounted to the frame member 16 opposite the opening 22 for suspending the marker 12 from a helicopter during delivery thereof to the line 24, the first loop 30 vertically protruding from the shell members 14a, 14b.

Figures 4, 5:
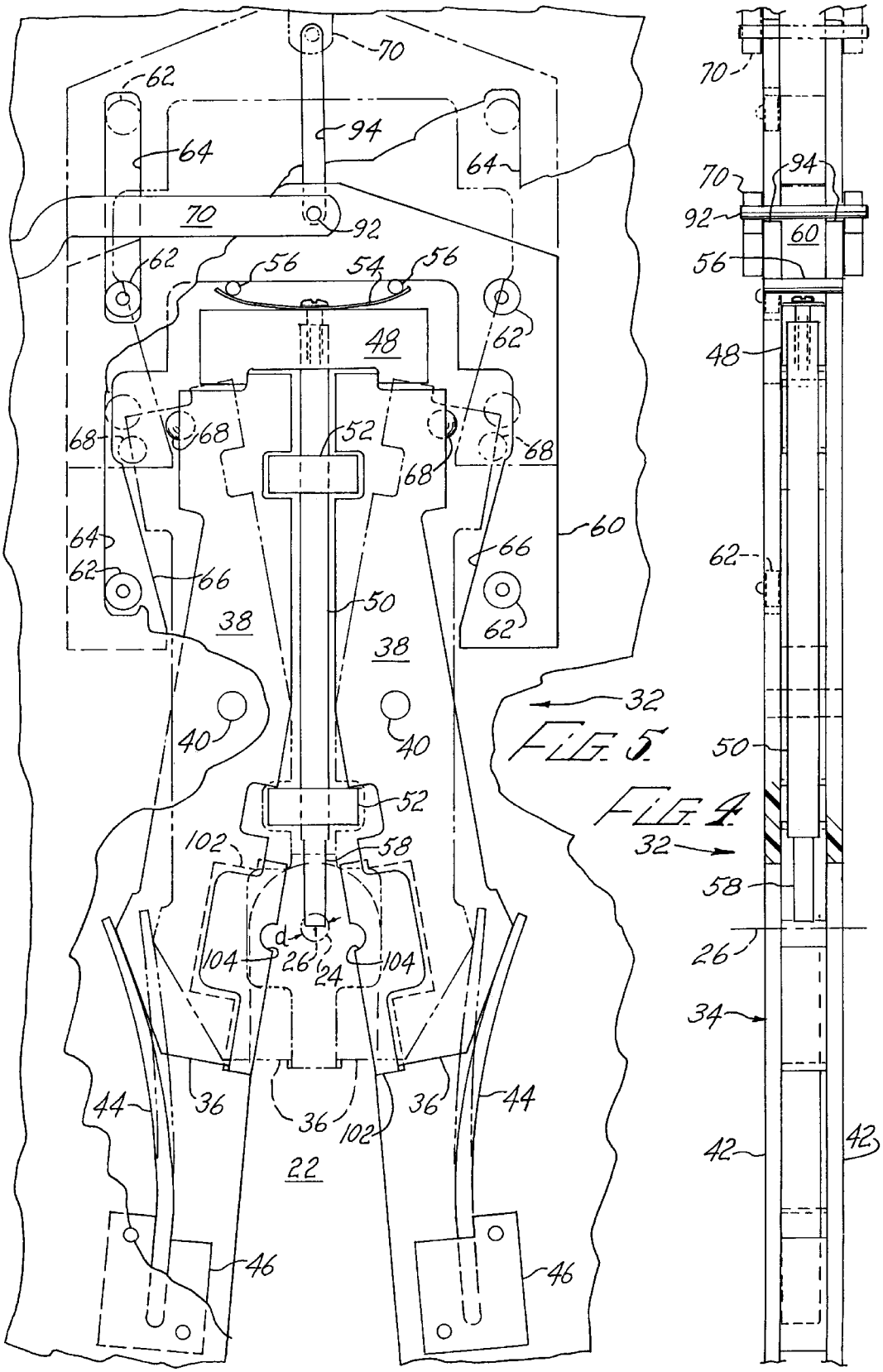
FIG. 4 is a fragmentary side sectional elevational view showing a portion the fixture of FIG. 2 on line 4—4 of FIG. 3.
FIG. 5 is a fragmentary end detail elevational view of the fixture portion of FIG. 4.

According to the present invention, the marker 12 includes a semi-automatic trap or clamp mechanism 32 that is supported on a bulkhead 34 substantially midway between the support shoes 28, the bulkhead 34 straddling the opening 22 and being fastened to the shell members 14a, 14b by fasteners 36. The clamp mechanism 32 includes a pair of jaw members 38 that are pivotably movable on corresponding jaw pins 40, opposite ends of the jaw pins 40 being supported by a pair of parallel-spaced panel members 42 of the bulkhead 34 that are located proximate opposite sides of the jaw members 38. The jaw members 38 are biased toward firmly clampingly gripping the line 24 by a trap closer *or driver*, such as respective jaw spring members 44, the spring members 44 each having a tapered leaf configuration being anchored to the bulkhead 34 by a corresponding spring block 46. The jaw members 38 are movable between an open position as indicated by solid lines in FIG. 5 and a closed position as indicated by dashed lines in FIGS. 3 and 5, the jaw members 38 being held in the open position by a [coking] *cocking* mechanism or trigger block 48 that is mounted to a trigger rod 50 for movement therewith, the trigger rod 50 being axially slidably supported by a spaced pair of trigger journals 52 that are fixably mounted between the panel members 42. The trigger block 48, together with the rod 50, is movable between a cocked position as shown in FIG. 5 and a released position as shown by dashed lines in FIG. 3, being biased toward the cocked position by a trigger spring 54 that is interposed between the trigger block 48 and a pair of stop pins 56 that fixably extend between the panel members 42. When the trigger block 48 is in the cocked position, the jaw members 38 being in the open position, a trigger extension 58 that forms a bottom extremity of the trigger rod 50 contacts the line 24 as the marker 12 is lowered into position on the line 24, the trigger rod 50 being thereby moved upwardly for driving the trigger block 48 toward the released position against the trigger spring 54 for releasing the jaw members 38, whereupon the line 24 becomes securely clamped between the jaw members 38 by operation of the jaw spring members 44.

The jaw members 38 are brought into the open position by operation of a yoke member 60 that is vertically movable between the panel members 42, being guided by a plurality of rollers 62, the rollers 62 engaging corresponding slots 64 that are formed in one or both of the panel members 42. The yoke member 60 has a pair of ramp surfaces 66 for contacting corresponding follower members 68 that protrude from respective ones of the jaw members 38, the jaw members 38 being moved from the closed position to the open position in response to upward movement of the yoke member 60. The yoke member 60 is coupled by a connector or cocking link 70 to a hook-engaging second loop 72 that extends outwardly from the marker 12 for retrieval and/or repositioning of the marker 12 as further described below. The yoke member 60, in combination with the cocking link 70 and the second loop 72, thus functions as a trap releaser for the clamp mechanism 32, the second loop 72 also functioning as a lifting hook receiver.

Figure 1:
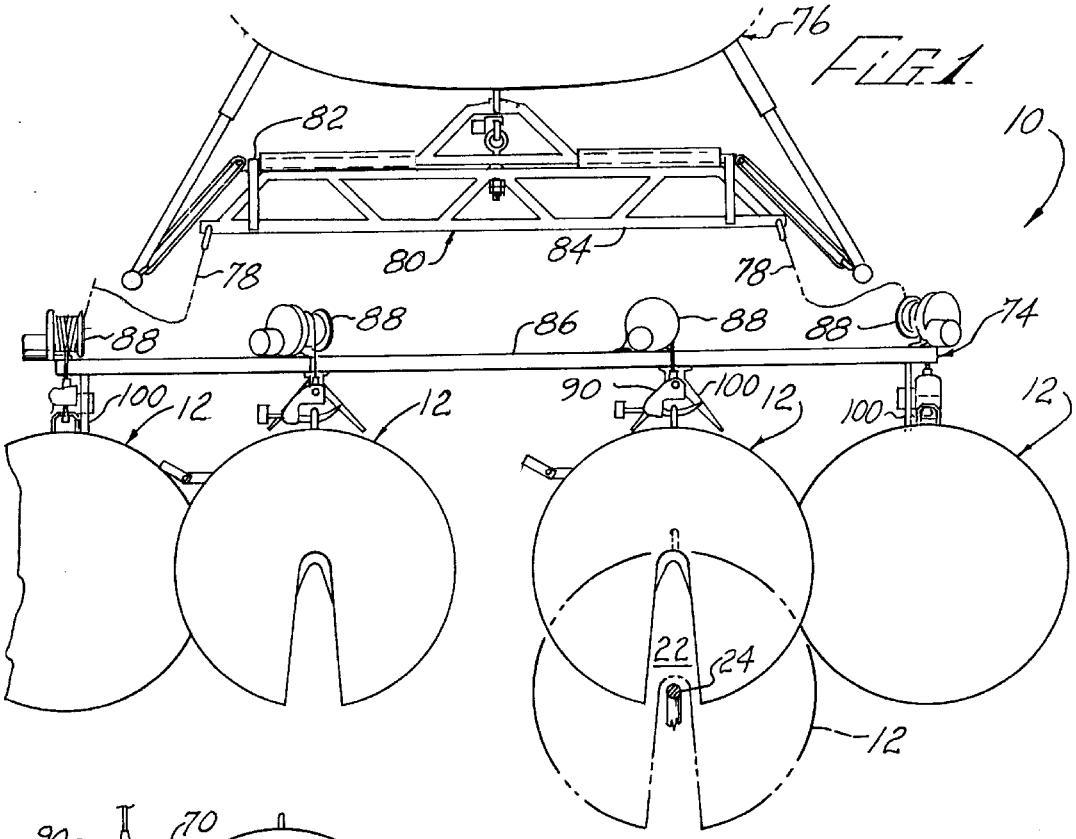
FIG. 1 is a fragmentary side elevational view of a transmission line fixture system having features according to the present invention, wherein fixtures of the system are manipulated by helicopter.
Figure 9:
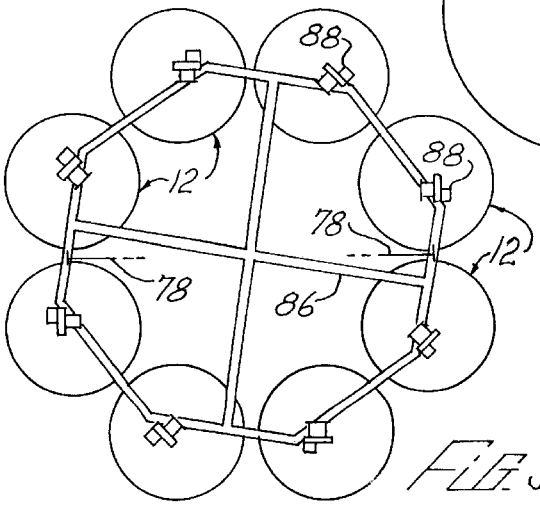
FIG. 9 is a top plan view of a delivery module portion of the system of FIG. 1.
Figure 2:
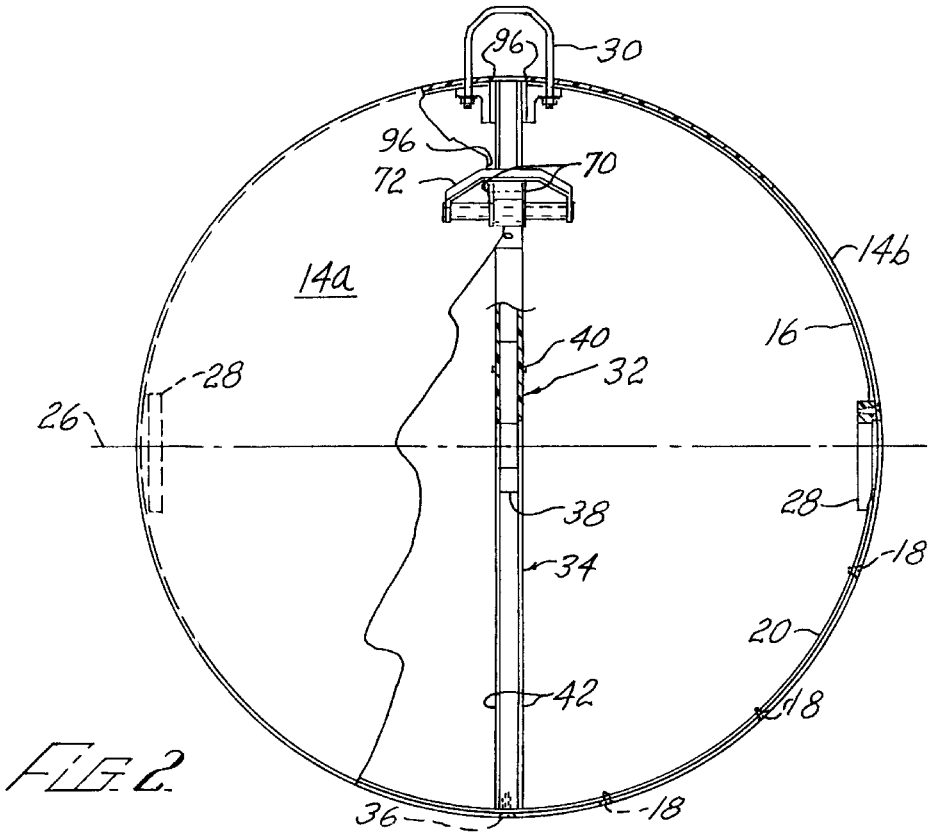
FIG. 2 is a fragmentary side elevational view of one of the fixtures of FIG. 1.

As further shown in FIGS. 1 and 9, the system 10 includes a delivery module 74 that is carried by a helicopter 76 as disclosed in U.S. Pat. No. 4,971,082 to Kovaletz, which is incorporated herein by this reference, the module 74 being suspended by a pair of cables 78 from a stabilizer assembly 80, the stabilizer assembly 80 having a resiliently located bar 82 and a releasably suspended yoke 84 that is aligned with the bar 82. The cables 78 are connected to a base or frame 86 of the delivery module 74 so that the module 74 is dampingly stabilized below the helicopter 76 in a manner that permits the module 74 to be manipulated relative to the power line 26 by appropriate maneuvering of the helicopter 76.

The delivery module 74 is equipped with a plurality of pilot-operated cargo hoist units 88 that are spaced about on the frame 86 for supporting a corresponding number of the markers 12, each of the hoist units having a remotely controlled cargo hook 90 for releasably engaging either of the first and second loops 30 and 72 of a marker 12. Typically, the outside diameter D of the markers is approximately 36 inches, the delivery module 74 being configured to hold eight of the markers 12 suspended in a circularly spaced array beneath the frame 86.

When deploying the markers 12, the helicopter is flown above the line 26 with the opening 22 of a selected one of the markers 12 aligned directly over the line 26 as shown by solid lines in FIG. 1. Preferably the hoist unit 88 for that marker 12 is momentarily activated for lowering the marker 12 onto the line 26 as shown by the dashed lines in FIG. 1, the line 26 being automatically clamped by the clamp mechanism 32 as described above. Finally, the cargo hook 90 is activated for releasing the first loop 30 of the marker 12 therefrom, whereupon the helicopter 76 may be operated for further deploying the markers 12.

Figure 6:
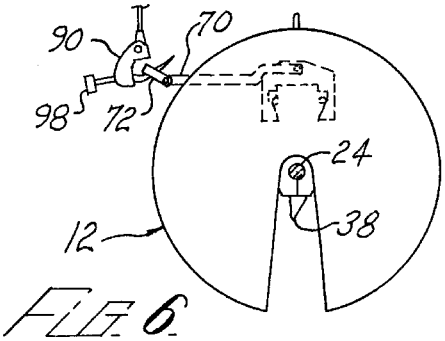
FIG. 6 is an end elevational view as in FIG. 3 at reduced scale, showing an initial stage of removal of the fixture of FIG. 2 from the line.

As described above, the second loop 72 extends laterally from the marker 12 when not in use, facilitating engagement by the cargo hook 90 as shown in FIG. 6 for removal or repositioning the marker 12 relative to the line 24 as described herein. As shown in the drawings, there are a pair of the cocking links 70 on opposite sides of the bulkhead 34, the links 70 being pivotally coupled the yoke member 60 by a yoke pin 92, the yoke pin 92 also extending through pin slots 94 that are formed in the panel members 42. The cocking links 70 also extend through respective link slots 96 that are formed in the first shell member 14a for permitting the second loop 72 to swing into approximate vertical alignment with the first loop 30.

Figure 7:
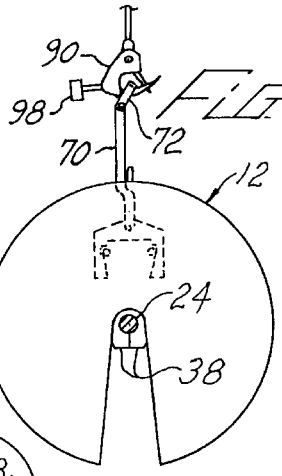
FIG. 7 is an end elevational view as in FIG. 6, showing an intermediate stage of removal and/or relocation of the fixture of FIG. 2.
Figure 8:
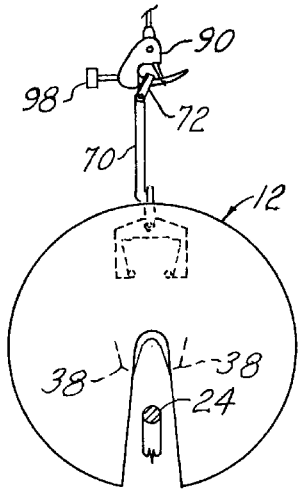
FIG. 8 is an end elevational view as in FIG. 6, showing a final stage of removal and/or an initial stage of relocation of the fixture of FIG. 2.

When retrieving or relocating the markers 12, the helicopter 76 is flown in a manner positioning an unused one of the cargo hooks 90 into engagement with the second loop 72. Once the second loop 72 is engaged by the cargo hook 90 as shown in FIG. 6, the hook 90 is raised such as by a climbing maneuver of the helicopter 76 or by operation of the cargo hoist 88. The second loop 72 is thus raised to a position vertically above the yoke member 60 as shown in FIG. 7, with further raising of the hook 74 producing upward movement of the yoke member 60 that results in cocking of the clamp mechanism 32 as shown in FIG. 8 and described above, whereby the jaw members 38 are positively opened for releasing the marker 12 from the line 24. Further, the marker 12 is immediately reusable by being relocated on the line 24 or a counterpart of same, in that once the marker 12 is relocated by being lowered onto the line 24, further lowering of the cargo hook 74 permits the yoke member 60 to return downwardly to the inactive position as indicated by the solid lines in FIG. 3, thereby permitting the jaw members 38 to be again moved to the closed position in response to the spring members 44.

Each of the cargo hooks 90 is provided with a counterweight 98 for providing an upward inclination thereto when the cargo hooks are unleaded as shown in FIG. 6 for facilitating engagement with the second loop 72. Also, the delivery module 74 is preferably provided with alignment cams 100 or other suitable means for bringing each of the cargo hooks 90 into a desired rotational alignment with the frame 86 as the cargo hooks 90 are raised into proximity with the frame 86.

Preferably the cocking links 70 are rigid members for permitting the lateral movement of the second loop 72 as described above while maintaining the opening 22 in alignment relative to the second loop 72 whereby the marker 12 is rotatable about a vertical axis in response to yawing of the helicopter 76 for alignment of the opening 22 relative to the line 24.

The markers 12 are preferably formed substantially exclusively of electrically nonconductive materials such as fiber-reinforced plastics for avoiding corona effects in the presence of high voltages. Preferably the jaw members 38 are provided with interchangeable resilient jaw inserts 102 for transmitting substantial clamping force to the line 26 without damaging same, the jaw inserts 102 also contacting the line 24 with a high frictional coefficient for preventing unwanted movement of the markers relative to the line 24 in the presence of high wind loading. The jaw inserts 102 can also be formed for accommodating variously sized lines 24, the lines 24 having an outside diameter d that can be as small as 0.5 inch (or less) and as large as approximately 2 inches. Each of the jaw inserts 102 is formed with a semicircular notch as indicated at 104 for receiving the line. The notches 104 can be located within the jaw inserts 102 for defining a fixed location of the line relative to the marker axis 26 regardless of the diameter d, in which case the shoes 28 at opposite ends of the opening 22 would be correspondingly reconfigured, and the extension 58 of the trigger rod 50 would also be selected (or adjusted) to impart the desired movement to the trigger block 48. Alternatively, the jaw inserts 102 and the shoes 28 can be configured for locating an upper extremity of the contacted locations along the line 24 in a predetermined relation to the marker axis 26, in which case the extension 58 of the trigger rod 50 would not require selection or adjustment for accommodating the lines 24 having the various diameters d.

Figure 10:
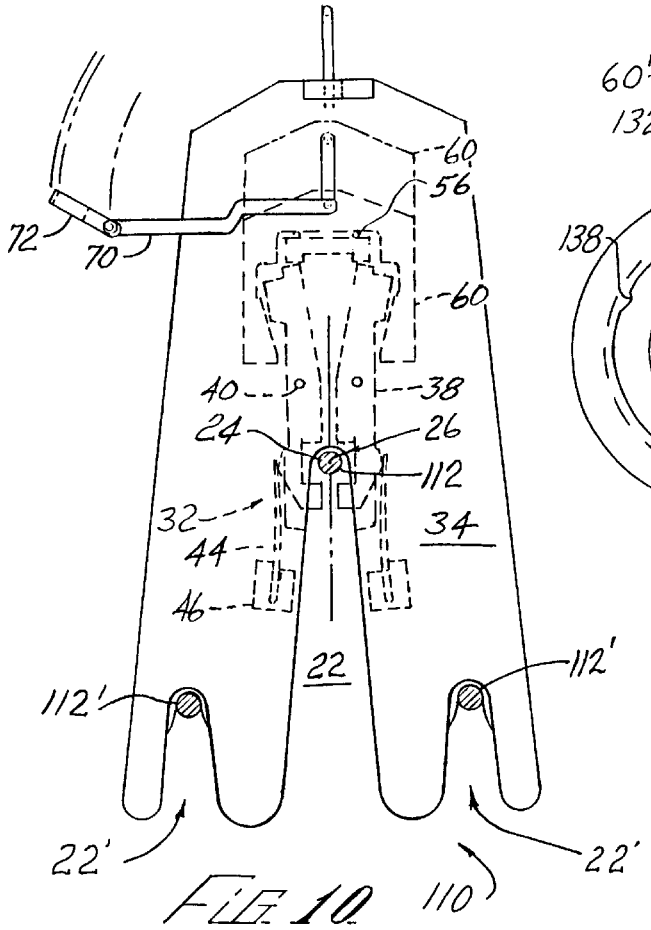
FIG. 10 is an elevational view as in FIG. 3, showing the apparatus of FIG. 1 configured as a spacer fixture for spacing a trio of conductors.
Figure 11:
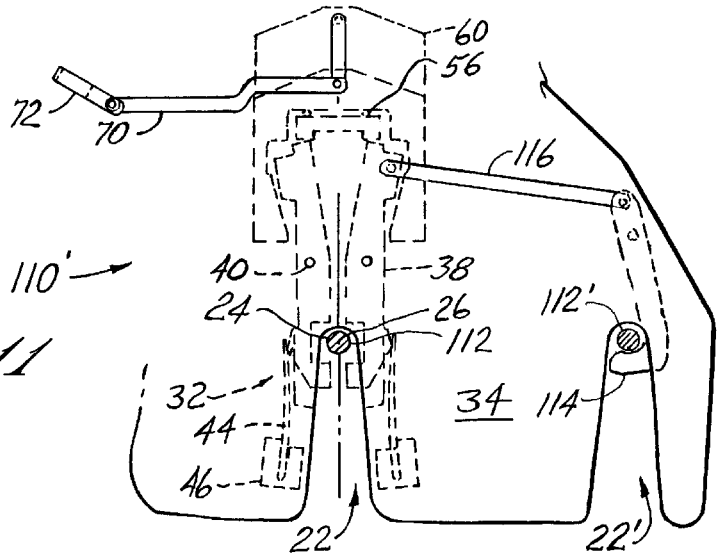
FIG. 11 is an elevational view of the fixture of FIG. 9 in an alternative configuration for spacing a pair of conductors.

With further reference to FIGS. 10 and 11, the present invention also provides a spacer fixture 110, the clamp mechanism 32 being operative for gripping one conductor 112 of the line 24, the bulkhead 34 being configured as a spacer body, having a pair of auxiliary slots or openings 22' formed therein for locating additional conductors 112' of the line 24 as shown in FIG. 10. In the configuration of FIG. 10 the conductors 112' are maintained in engagement with the openings 22' by a combination of the clamp mechanism 32 and tension that is normally present in the conductors 112 and 112'.

FIG. 11 shows another configuration of the spacer fixture, designated 110', for use with the line 24 including a group of only two spaced conductors, 112 and 112'. As shown in FIG. 11, the fixture 110' includes a latch member 114 that is pivotally connected to the bulkhead 34 for holding the conductor 112' within the opening 22' when the clamp mechanism 32 is activated and gripping the conductor 112. A latch link 116 is pivotally connected between the latch member 114 and one of the jaw members 38 for activating the latch member in correspondence with activation of the clamp mechanism 32.

Figure 12:
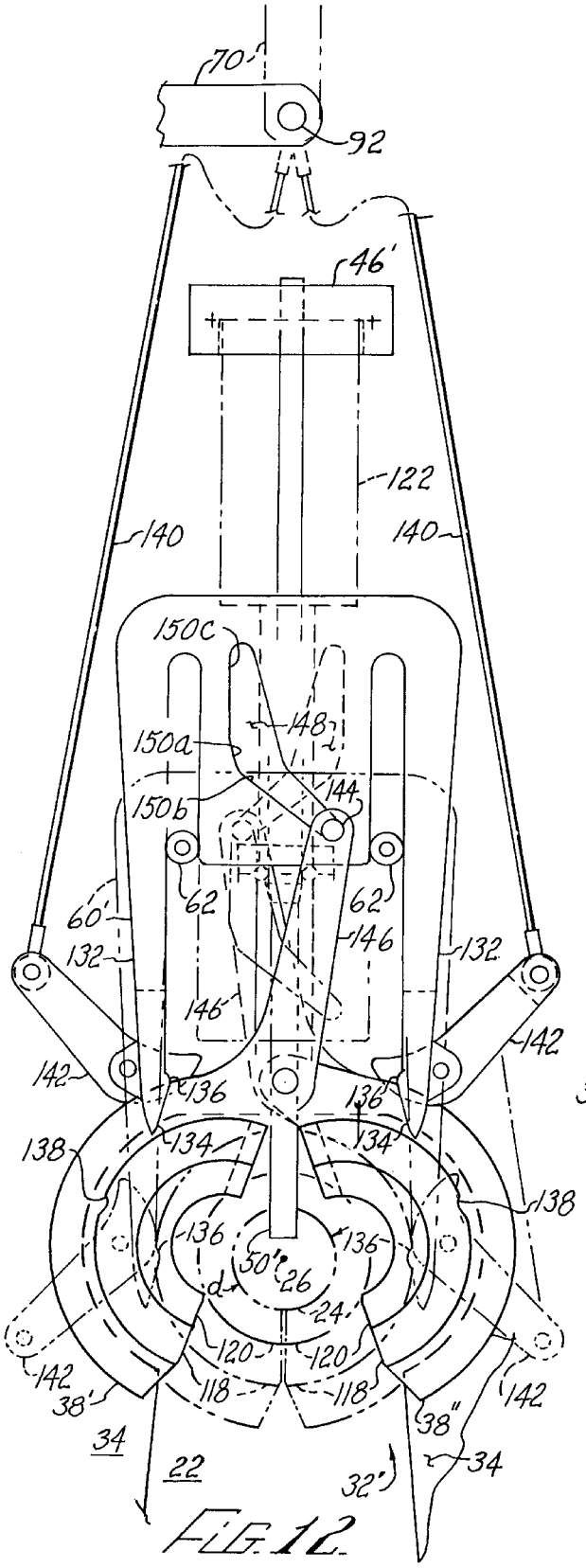
FIG. 12 is a fragmentary end detail view as in FIG. 5, showing an alternative configuration of the fixture portion of FIG. 4.
Figure 13:
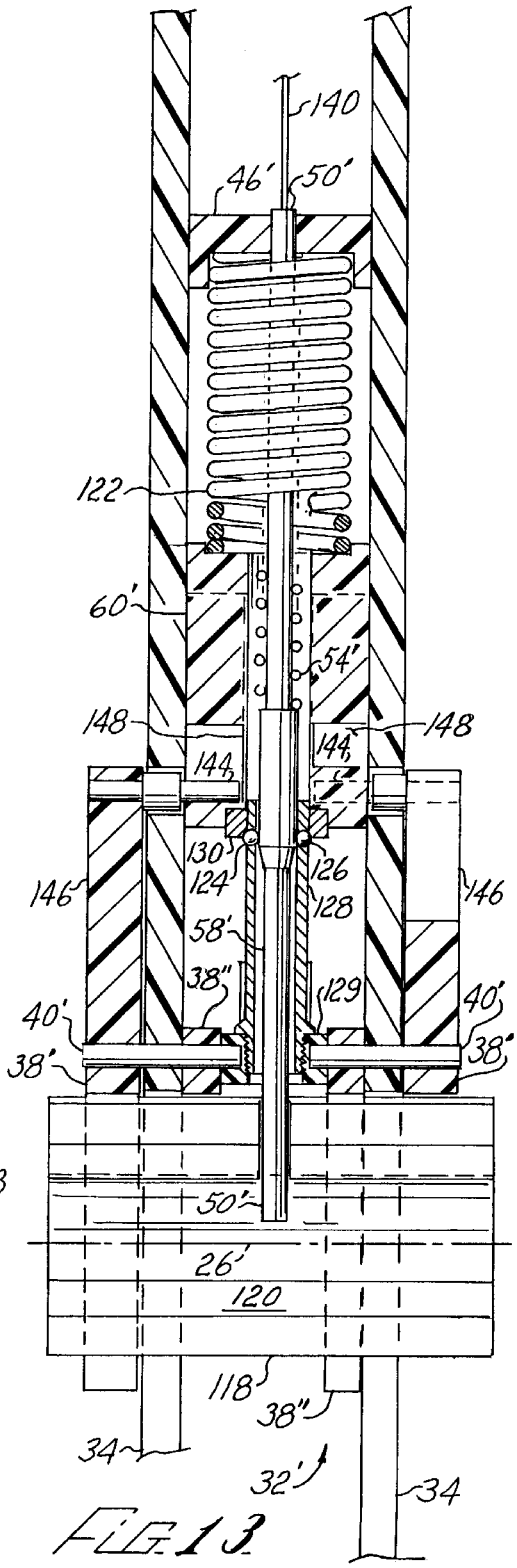
FIG. 13 is a fragmentary elevational detail view as in FIG. 4, showing the alternative configuration of FIG. 12.

With further reference to FIGS. 12 and 13, an alternative configuration of the trap mechanism 32, designated 32' has counterparts of the jaw members 38, designated 38' and 38", in longitudinally spaced pairs pivotally mounted by an axially spaced pair of jaw pins 40' on opposite sides of the bulkheads 34. A rigid semicircular cuff member 118 is fixably mounted to each pair of the jaw members 38' and 38" the cuff members 118 each being provided with a resilient semi-circular cuff liner 120 for gripping the line 24. Gripping pressure is applied directly to the cuff members 118 by a counterpart of the yoke member 60, designated 60' the yoke member 60' being driven to an engaged position as indicated by dashed lines in FIG. 12 by means of a main spring 122, the yoke member 60' being guided between the bulkheads 34 and by counterparts of the rollers 62. The clamp mechanism 32' has a counterpart of the trigger rod 50 designated 50' the yoke member 60' being supported in a cocked position shown by solid lines in FIG. 12 by means of a ball latch 124 when the trigger rod 50' extends into space to be occupied by the line 24 in the clamped position thereof. The ball latch 124 includes a plurality of bearing balls 126 that are carried in walls of a cylindrical retainer 128, the balls 126 being forced outwardly by an enlarged portion of the trigger rod 50' into interfering contact with a ring member 130 that is fixably located relative to the yoke member 60' for preventing downward movement thereof. The cylindrical retainer 128 is locatingly supported by threaded engagement with a block 129, the block 129 being supported between the jaw members 38" on extremities of the jaw pins 40'. The main spring 122 is compressed by a counterpart of the spring block, designated 46' the block 46' being fixedly fastened between the bulkheads 34. The spring block 46' also guides an upper extremity of the trigger rod 50'. Upward movement of the trigger rod 50' compressing a helical trigger spring 54' against the spring block 46', allows radially inward movement of the balls 126 toward an extension portion 58' of the trigger rod 50' for permitting the yoke member 60' to be driven downwardly by the main spring 122 when the marker unit 12 is lowered onto the line 24.

The yoke member 60' is formed with *a driver in the form of* downwardly extending leaf spring leg portions 132 that spring slightly outwardly on the cuff members 118 as the yoke member 60' moves into the engaged position, each of the leg portions 132 having a ramp extremity 134 smoothly engaging the respective cuff member 118 and a detent portion 136 that preferably engages a corresponding groove 138 that is formed on an outwardly facing extremity of the cuff member 118 for releasably locking the yoke member 60' in the engaged position.

In the configuration of FIGS. 12 and 13, the cocking link 70 is connected through a pair of tension members 140 to a pair of release cam levers 142 that are pivotally mounted proximate lower extremities of the leg portions 132 for prying the detent portions 136 from engagement with the grooves 138 when the cocking link 70 is raised as described above, the yoke member 60' being lifted to the cocked position wherein the bearing balls 126 are again driven outwardly for supporting the yoke member 60' against downward pressure from the main spring 122. The balls 126 are driven outwardly by downward movement of the trigger rod 50' in response to the trigger spring 54' after the marker unit 12 is lifted from the line 24.

A pair of follower pins 144 protrude from respective arm portions 146 of the jaw members 38' for engaging corresponding cam cavities 148 that are formed in opposite sides of the yoke member 60' each of the cam cavities 148 having a first ramp portion 150a for producing slight opening movement of the respective cuff members 118 at high mechanical advantage as the yoke member 60' is raised through an intermediate position, the first ramp portions 150a being operative for overcoming adhesion of the cuff liners 120 to the line 24 that might be encountered, particularly following extended deployment of the marker unit 12 on the line 24. A second ramp portion 150b of each cam cavity 148 operates at low mechanical advantage for fully opening the cuff members 118 to the position shown by solid lines in FIG. 12 as the yoke member 60' is moved the remaining distance to the cocked position by the cocking link 70. A vertically oriented third ramp portion 150c permits vertical movement of the yoke member 60' from the engaged position a sufficient distance for producing clearance between the ramp extremities 134 and the cuff members 118 before the cuff members 118 start to separate in response to further upward movement of the yoke member 60'.

The clamp mechanism 32' of FIGS. 12 and 13 is particularly advantageous in that the yoke member 60' locks into the closed position by over-center engagement with the cuff members 118. The leg portions 132 deflect only slightly during engagement. Consequently, the force by which the jaw members 38' and 38" are maintained in the closed position is unlikely to decay (by a phenomenon known as creep) significantly with time as might otherwise be the case with highly stressed spring members that are required to indefinitely store the full energy required to close the clamp mechanism 32. Conversely, the main spring 122 is required to store sufficient energy to effect latching of the yoke member 60', but only until the fixture 12 is deployed on the line 24. Once the clamp mechanism 321 is closed onto the line 24, the jaw members 38' and 38" are securely locked against greatly increased opening forces that might be encountered such as during severe weather.

Figure 14:
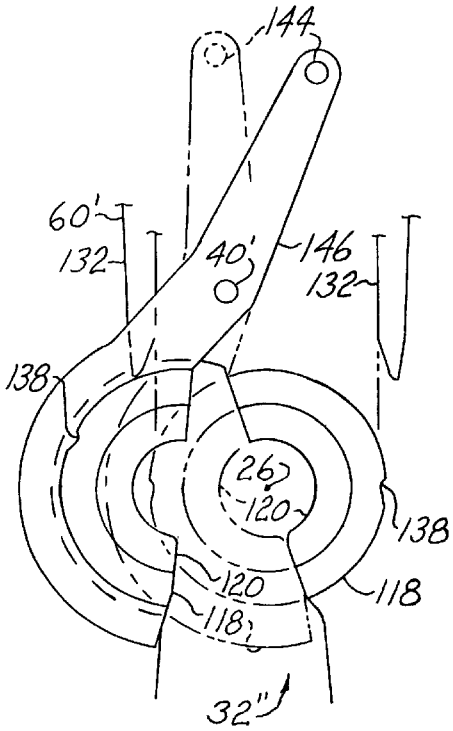
FIG. 14 is a fragmentary end detail view showing a modification of the configuration of FIGS. 12 and 13.

With further reference to FIG. 14, the clamp assembly 32 can be implemented with only one of the jaw members 38. As shown in FIG. 14, an alternative configuration of the clamp assembly 32' designated 32" has only one of the jaw members 38' (and one of the jaw members 38" not shown), one of the cuff members 118 being rigidly supported between the jaw members 38' and 38". The other of the cuff members 118 is fixably supported between the bulkheads 34. The jaw pins 40' are laterally offset from the marker axis 26, and the cuff members 118 are tilted about the axis 26 as shown in FIG. 14 for facilitating entry of the line 24 between the cuff liners 120.

Figure 15:
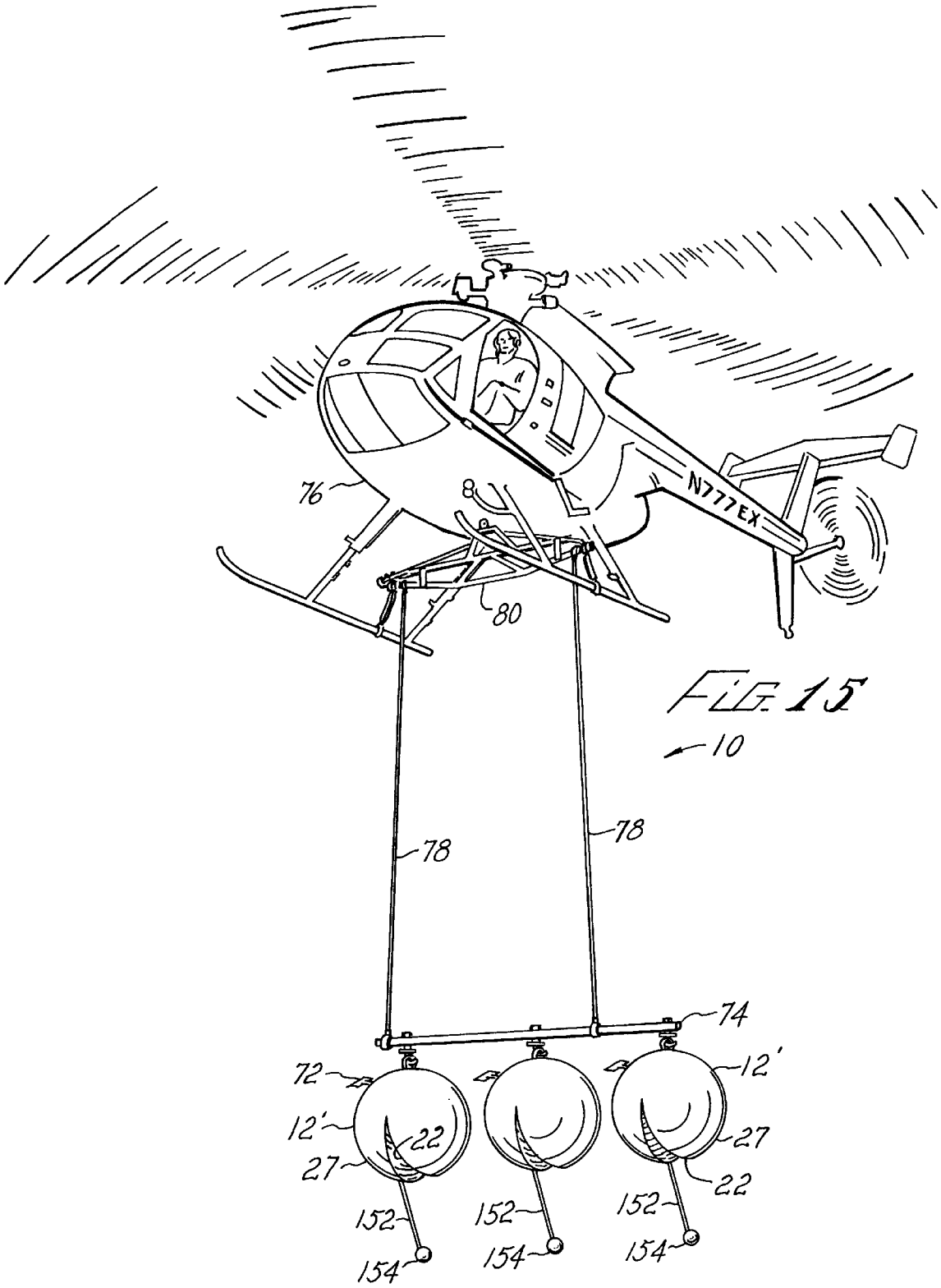
FIG. 15 is an oblique elevational perspective view of the transmission line fixture system of FIG. 1, showing the fixtures in an alternative configuration.

With further reference to FIG. 15, the system 10 can be provided with at least some of the marker units 12 in an alternative configuration, designated 12' each of the fixtures 12' having a weighted column member 152 rigidly depending from a lower portion of the housing 27 to one side of the opening 22. As shown in FIG. 15, a lower extremity of each column member 152 is preferably weighted by a counterweight 154 enhancing stability of the marker 12' in an upright position on the line 24. The counterweight 154, being spaced below the housing 27, provides a greater righting moment than would an internal counterweight of the housing 27. This feature is particularly advantageous in the event of ice loads that might accumulate on one side of the housing 27 during freezing rain and wind. A further and important advantage of the column member 152 is that positioning of the marker 12' with the opening 22 aligned with the line 24 is facilitated by contact between the column member 152 and the line 24 immediately prior to lowering of the marker 12' onto the line 24.

Although the present invention has been described in considerable detail with reference to certain preferred versions thereof, other versions are possible. For example, the shell members 14a, 14b can be formed with reinforced, interlocking edge extremities in place of the frame member 16. Also, the shell members 14a, 14b can have shapes other than spherical. Further, the markers 12 can be suspended initially from the delivery module 74 by the second loops 72 such that the first loops 30 are not required. Moreover, the delivery module 74 can be equipped with a single one of the cargo hoists 88, in combination with a feeder for sequentially feeding the markers into engagement with the cargo hook 90 of the cargo hoist 88. Also, a flexible member can be substituted for the jaw inserts 102, the flexible member automatically commodating lines 24 that are variously sized. Moreover, the spacer fixture 110 of FIG. 10 can be provided with counterparts of the latch member 114 from the fixture 110' of FIG. 11. Therefore, the spirit and scope of the appended claims should not necessarily be limited to the description of the preferred versions contained herein.

What is claimed is:

1. A fixture apparatus for an elevated utility line, comprising:

(a) a body having a slot formed therein for receiving a conductor of the line;

(b) a trap supported relative to the body for holding the conductor within the slot, the trap being activated by movement of the conductor into the slot; and (c) a trap releaser for releasing the trap during removal of the body from the conductor, comprising:

(i) a hook receiver movably connected to the body for support thereof during removal of the body from the conductor; and (ii) connector means for connecting the hook receiver to the trap for release thereof when the body is supported by the hook receiver, without preventing subsequent reactivation of the trap.

2. The apparatus of claim 1, wherein the trap comprises:

(a) a first jaw member, the first jaw member being movable between an open position for receiving the conductor when the conductor is within the slot, and a closed position for clamping the conductor;

(b) a trap closer for moving the first jaw member toward the closed position;

(c) a cocking mechanism for holding the first jaw member in the open position; and (d) a trigger mechanism for releasing the cocking mechanism, the trigger mechanism being activated by contact with the conductor.

3. The apparatus of claim 2, wherein the connector means comprises a tension member connected to the hook receiver for movement thereby, wherein movement of the tension member results in movement of the first jaw member against the trap closer.

4. The apparatus of claim 2, wherein the first jaw member is pivotally movable relative to the body and operatively connected to the trap closer.

5. The apparatus of claim 2, wherein the trap closer comprises a cantilevered leaf spring, the leaf spring extending from the first jaw member to a stationary member for biasing the first jaw member.

6. The apparatus of claim 5, wherein the connector means comprises:

(a) a cam member movably supported relative to the body and having at least one cam surface;

(b) a tension member connected between the hook receiver and the cam member; and (c) a follower connected to the jaw member for moving the jaw member to the open position in response to upward movement of the hook receiver relative to the housing.

7. The apparatus of claim 6, wherein the cam member is operative for providing initial opening movement of the jaw member at high mechanical advantage for overcoming adhesion between the jaw member and the conductor, further opening movement being at reduced mechanical advantage with respect to the high mechanical advantage.

8. The apparatus of claim 2, wherein the trap further comprises a second jaw member movable between open and closed positions, the conductor being received between the jaw members in the open position and clamped between the jaw members in the closed position thereof.

9. The apparatus of claim 1, adapted for deployment from a hoverable vehicle, the vehicle having a load attachment point, the apparatus further comprising:

(a) base means for defining a base;

(b) attachment means for releasably suspending the base means from the load attachment point;

(c) storage means on the base means for storing a plurality of the bodies; and (d) at least one releasable marker hook for engaging the hook receiver of one of the plurality of bodies, whereby the plurality of bodies are sequentially affixable at selected locations along the conductor, and whereby at least one of the plurality of bodies is retrievable from the conductor by engagement of the hook receiver thereof by the marker hook.

10. The apparatus of claim 9, wherein the attachment means comprises:

(a) a rigid stabilizer bar supportively connected relative to the attachment point and resiliently oriented relative to the vehicle;

(b) a yoke member releasably supported relative to the load attachment point, the yoke member fixably engaging the stabilizer bar when the yoke member is supported relative to the load attachment point;

(c) stabilizer biasing means for yieldably holding the stabilizer bar fixed about a vertical axis and at least one horizontal axis of the vehicle; and (d) means for suspending the base means from the yoke member.

11. The apparatus of claim 10, wherein the means for suspending the base means from the yoke member comprises a pair of load tension members, the load tension members being connected from opposite ends of the yoke member to spaced apart locations on the base means.

12. The apparatus of claim 10, further comprising means for defining a spaced pair of anchor points on the vehicle, and wherein the stabilizer biasing means comprises a pair of elastically extendable members, each of the extendable members extending from proximate a respective end of the bar to proximate a respective one of the anchor [point] *points*.

13. The apparatus of claim 9, wherein the attachment means comprises:

(a) registration means rigidly connected to the base, the registration means being adapted for engaging a structural element of the vehicle; and (b) a base hook engagement member attached to the base for engagement by the attachment means, whereby a combination of the base hook engagement member and the registration means is capable of holding the base at least yieldably fixed relative to the vehicle.

14. The apparatus of claim 1, wherein the hook receiver is a movable hook receiver, the apparatus further comprising a fixed hook receiver on the body for support thereof during positioning of the body on the conductor.

15. The apparatus of claim 1, further comprising a column member rigidly depending from the body adjacent the slot for facilitating guidance of the conductor into the slot.

16. The apparatus of claim 15, further comprising a counterweight rigidly connected proximate a lower extremity of the column member for facilitating maintenance of the body in an upright position on the conductor.

17. The apparatus of claim 1, wherein the body includes a marker housing for delineating the conductor.

18. The apparatus of claim 1, wherein the line has a plurality of conductors including a closely spaced group of the conductors, the slot being a primary slot for receiving one of the conductors, the body having at least one secondary slot for engaging at least one other conductor of the group, the apparatus holding the engaged conductors in a predetermined spaced relation.

19. The apparatus of claim 18, including a latch member supported relative to the secondary slot, the latch member being operable when the trap is activated to clamp the one conductor for holding the other conductor within the secondary slot.

20. The apparatus of claim 19, wherein the latch member is coupled to the trap and to the trap releaser for operation of the latch member corresponding to activation and release of the trap.

21. The apparatus of claim 18, wherein the group includes the one conductor and at least two other conductors, the at least one secondary slot being a plurality of secondary slots, one of the plurality of secondary slots for each of the other conductors, the conductors being spaced by the apparatus whereby the combination of the trap and engagement of conductors with the secondary slots restrains the body from disengagement with the other conductors when the trap is activated.

22. Apparatus for marking an elevated utility line, the apparatus being adapted for deployment from a hoverable vehicle, the vehicle having a load attachment point, the apparatus comprising:

(a) at least one marker comprising:

(i) a marker housing having a slot formed therein for receiving the line;

(ii) a trap for holding the line within the slot, the trap being activated by movement of the line into the slot, the trap comprising a first jaw member, the jaw member being movable between an open position for receiving the line when the line is within the slot, and a closed position for clamping the line; a trap closer for moving the first jaw member toward the closed position, the jaw member being pivotally movable relative to the housing; a cocking mechanism for holding the first jaw member in the open position, and a trigger mechanism for releasing the cocking mechanism, the trigger mechanism being activated by contact with the line; and (iii) a trap releaser for releasing the trap during removal of the housing from the line, the trap releaser comprising a hook receiver movably connected to the housing for support thereof during removal of the housing from the line; and a connector for connecting the hook receiver to the trap for release thereof when the housing is supported by the hook receiver, without preventing subsequent reactivation of the trap;

(b) base means for defining a base;

(c) attachment means for releasably suspending the base means from the load attachment point, the attachment means comprising:

(i) a rigid stabilizer bar supportively connected relative to the attachment point and resiliently oriented relative to the vehicle;

(ii) a yoke member releasably supported relative to the load attachment point, the yoke member fixably engaging the stabilizer bar when the yoke member is supported relative to the load attachment point;

(iii) stabilizer biasing means for yieldably holding the stabilizer bar fixed about a vertical axis and at least one horizontal axis of the vehicle; and (iv) means for suspending the base means from the yoke member;

(d) storage means on the base means for storing a plurality of the marker housings; and (e) at least one releasable marker hook for engaging the hook receiver of one of the plurality of marker [housing] *housings*, whereby the plurality of marker housings are sequentially affixable at selected locations along the line, and whereby at least one of the plurality of marker [housing] *housings* is retrievable from the line by engagement of the hook receiving member thereof by the marker hook.

23. The apparatus of claim 22, wherein the trap further comprises a second jaw member movable between open and closed positions, the line being received between the jaw members in the open position and clamped between the jaw members in the closed position thereof.

*24. A fixture apparatus for an elevated utility line, comprising:*

*(a) a body having a slot formed therein for receiving a conductor of the utility line;*

*(b) a trap supported relative to the body for holding the conductor within the slot, the trap comprising:*

*(i) a clamp having an open position for receiving the conductor and a closed position for clamping the conductor; and*

*(ii) a driver movably supported relative to the body between a first position corresponding to the open position of the clamp and a second position wherein the clamp is forcibly retained in the closed position; and*

*(c) a trap releaser for releasing the trap, and for supporting the body during removal thereof from the utility line, the trap releaser comprising:*

*(i) a receiver movably connected to the body for support of the body during the removal; and*

*(ii) a connector coupled between the receiver and the driver for moving the driver from the second position to the first position when the body is supported by the receiver.*

*25. The apparatus of claim 24, wherein the clamp comprises a first jaw member, the first jaw member being movable between an open position for receiving the conductor when the conductor is within the slot, and a closed position for clamping the conductor, and wherein the driver comprises a cam element for moving the first jaw member toward the closed position.*

*26. The apparatus of claim 25, further comprising an actuator for moving the driver from the first position to the second position.*

*27. The apparatus of claim 26, wherein the actuator comprises a main spring.*

*28. The apparatus of claim 27, wherein the main spring is supportively connected to the body, the main spring being cocked by operation of the trap releaser.*

*29. The apparatus of claim 25, the driver making detented engagement with the first jaw member for securing the closed position thereof.*

*30. The apparatus of claim 29, wherein the connector includes a release cam movably connected between the driver and the first jaw member for deflecting the driver out of the detented engagement during initial movement of the driver toward the first position thereof by the receiver.*

*31. The apparatus of claim 25, wherein the first jaw member is pivotally movable relative to the body and operatively connected to the driver for movement between the closed and open positions in response to movement of the driver.*

*32. The apparatus of claim 25, wherein the trap further comprises a second jaw member movable between open and closed positions, the conductor being received between the jaw members in the open position and clamped between the jaw members in the closed position thereof.*

*33. The apparatus of claim 24, wherein the receiver is a movable receiver, the apparatus further comprising a fixed receiver on the body for support thereof during positioning of the body on the conductor.*

*34. The apparatus of claim 24, further comprising a column member rigidly depending in proximate alignment with the slot for facilitating guidance of the conductor into the slot.*

*35. The apparatus of claim 34, the column member being supported by the body, the apparatus further comprising a counterweight rigidly connected proximate a lower extremity of the column member for facilitating maintenance of the body in an upright position on the conductor.*

*36. The apparatus of claim 24, wherein the body includes a marker housing for delineating the conductor.*

*37. The apparatus of claim 24, wherein the trap is activated upon movement of the line into the slot.*

*38. A fixture apparatus for an elevated utility line, comprising:*

*(a) a body having a slot formed therein for receiving a conductor of the utility line;*

*(b) a trap supported relative to the body for holding the conductor within the slot, the trap comprising:*

*(i) a clamp having an open position for receiving the conductor and a closed position for clamping the conductor, the clamp comprising a first jaw member, the first jaw member being movable between an open position for receiving the conductor when the conductor is within the slot, and a closed position for clamping the conductor; and*

*(ii) a driver movably supported relative to the body between a first position corresponding to the open position of the clamp and a second position wherein the clamp is forcibly retained in the closed position, the driver comprising a cam element for moving the first jaw member toward the closed position; and*

*(c) a trap releaser for releasing the trap during removal of the body from the conductor, comprising:*

*(i) a receiver movably connected to the body for support of the body during the removal; and*

*(ii) a connector coupled between the receiver and the driver for moving the driver from the second position to the first position when the body is supported by the receiver, the connector comprising a cam member supported relative to the driver and having at least one opening cam surface; a tension member connected between the receiver and the cam member; and a follower connected to the jaw member for moving the jaw member to the open position in response to upward movement of the receiver relative to the housing.*

*39. The apparatus of claim 38, wherein the cam member is operative for providing initial opening movement of the jaw member at high mechanical advantage for overcoming*

*adhesion between the jaw member and the conductor, further opening movement being at reduced mechanical advantage.*

*40. A fixture apparatus for an elevated utility line, adapted for deployment from a hoverable vehicle, the vehicle having a load attachment point, the apparatus comprising:*

*(a) a body having a slot formed therein for receiving a conductor of the utility line, and a first receiver for supporting the body during the deployment;*

*(b) a trap supported relative to the body for holding the conductor within the slot the trap comprising:*

*(i) a clamp having an open position for receiving the conductor and a closed position for clamping the conductor; and*

*(ii) a driver movably supported relative to the body between a first position corresponding to the open position of the clamp and a second position wherein the clamp is forcibly retained in the closed position;*

*(c) a trap releaser for releasing the trap during removal of the body from the conductor, comprising:*

*(i) a second receiver movably connected to the body for support of the body during the removal; and*

*(ii) a connector coupled between the second receiver and the driver for moving the driver from the second position to the first position when the body is supported by the second receiver;*

*(d) a base;*

*(e) attachment means for releasably suspending the base from the load attachment point;*

*(f) storage means on the base for storing the body; and*

*(g) a releasable coupler supported relative to the base for engaging the first receiver of the body,*

*whereby the body is affixable at a selected location along the conductor; and*

*whereby the body is retrievable from the conductor by engagement of the second receiver thereof by the coupler.*

*41. The apparatus of claim 40, wherein the attachment means comprises:*

*(a) a rigid stabilizer bar supportively connected relative to the attachment point and resiliently oriented relative to the vehicle;*

*(b) a yoke member releasably supported relative to the load attachment point, the yoke member fixably engaging the stabilizer bar when the yoke member is supported relative to the load attachment point;*

*(c) stabilizer biasing means for yieldably holding the stabilizer bar fixed about a vertical axis and at least one horizontal axis of the vehicle; and*

*(d) means for suspending the base from the yoke member.*

*42. The apparatus of claim 41, wherein the means for suspending the base from the yoke member comprises a pair of load tension members, the load tension members being connected from opposite ends of the yoke member to spaced apart locations on the base.*

*43. The apparatus of claim 41, further comprising means for defining a spaced pair of anchor points on the vehicle, and wherein the stabilizer biasing means comprises a pair of elastically extendable members, each of the extendable members extending from proximate a respective end of the bar to proximate a respective one of the anchor points.*

*44. The apparatus of claim 40, wherein the attachment means comprises:*

*(a) registration means rigidly connected to the base, the registration means being adapted for engaging a structural element of the vehicle; and*

*(b) a base hook engagement member attached to the base for engagement by the attachment means, whereby a combination of the base hook engagement member and the registration means is capable of holding the base at least yieldably fixed relative to the vehicle.*

*45. A fixture apparatus for an elevated utility line, the line having a plurality of conductors including a closely spaced group of the conductors, the apparatus comprising:*

*(a) a body having a primary slot formed therein for receiving one of the plurality of conductors, the body having at least one secondary slot for engaging at least one other conductor of the group, the apparatus holding the engaged conductors in a predetermined spaced relation;*

*(b) a trap supported relative to the body for holding the one conductor within the primary slot, the trap comprising:*

*(i) a clamp having an open position for receiving the one conductor and a closed position for clamping the one conductor; and*

*(ii) a driver movably supported relative to the body between a first position corresponding to the open position of the clamp and a second position wherein the clamp is forcibly retained in the closed position; and*

*(c) a trap releaser for releasing the trap during removal of the body from the conductors, comprising:*

*(a) a receiver movably connected to the body for support of the body during the removal; and*

*(ii) a connector coupled between the receiver and the driver for moving the driver from the second position to the first position when the body is supported by the receiver.*

*46. The apparatus of claim 45, including a latch member supported relative to the secondary slot, the latch member being operable when the trap is activated to clamp the one conductor for holding the other conductor within the secondary slot.*

*47. The apparatus of claim 46, wherein the latch member is coupled to the trap and to the trap releaser for operation of the latch member corresponding to activation and release of the trap.*

*48. The apparatus of claim 45, wherein the group includes the one conductor and at least two other conductors, the at least one secondary slot being a plurality of secondary slots, one of the plurality of secondary slots for each of the other conductors, the conductors being spaced by the apparatus whereby the combination of the trap and engagement of conductors with the secondary slots restrains the body from disengagement with the other conductors when the trap is activated.*

*49. Apparatus for marking an elevated utility line, the apparatus being adapted for deployment from a hoverable vehicle, the vehicle having a load attachment point, the apparatus comprising:*

*(a) at least one marker comprising:*

*(i) a marker housing having a slot formed therein for receiving the utility line;*

*(ii) a trap for holding the line within the slot, the trap comprising a jaw member, the jaw member being movable between an open position for receiving the line when the line is within the slot, and a closed position for clamping the line; a clamping mechanism for moving the jaw member to and maintaining the closed position; and*

*(iii) a trap releaser for opening the trap during removal of the housing from the line, the trap releaser com-*

*prising a receiver movably connected to the housing for supporting the body during the removal; and a connector coupled between the receiver and the clamping mechanism for moving the jaw member to the open position when the housing is supported by the receiver;*

(*b*) *a base;*

(*c*) *attachment means for releasably suspending the base from the load attachment point, the attachment means comprising:*

(*i*) *a rigid stabilizer bar supportively connected relative to the attachment point and resiliently oriented relative to the vehicle;*

(*ii*) *a yoke member releasably supported relative to the load attachment point, the yoke member fixably engaging the stabilizer bar when the yoke member is supported relative to the load attachment point;*

(*iii*) *stabilizer biasing means for yieldably holding the stabilizer bar fixed about a vertical axis and at least one horizontal axis of the vehicle; and*

(*iv*) *means for suspending the base from the yoke member;*

(*d*) *a releasable marker coupler on the base, the marker coupler being engagable with the at least one marker for support thereof relative to the base, the marker being affixable at a selected location along the line and releasable from the base; and*

(*e*) *an actuator for activating the clamping mechanism when the line extends into the slot for engagement by the trap,*

*whereby the at least one marker is affixable at a selected location along the utility line, and*

*whereby the at least one marker is retrievable from the line by engagement of the receiver of the trap releaser by a coupling device.*

* * * * *